UNITED STATES PATENT OFFICE.

HENRY V. DUNHAM, OF MOUNT VERNON, NEW YORK.

RESINOUS CONDENSATION PRODUCT AND PROCESS OF MAKING SAME.

1,324,649.  Specification of Letters Patent.  Patented Dec. 9, 1919.

No Drawing.  Application filed April 4, 1919. Serial No. 287,552.

*To all whom it may concern:*

Be it known that I, HENRY V. DUNHAM, a citizen of the United States, residing at Mount Vernon, in the county of Westchester and State of New York, have invented certain new and useful Improvements in Resinous Condensation Products and Processes of Making Same, of which the following is a specification.

The present invention relates to the production of polymerized compounds from unsaturated hydrocarbons, particularly compounds of the di-ene series of which an example is isoprene. The object of the invention is to economically and efficiently convert the di-enes into polymerized products or condensation products, most of which are of a resinous character.

As a specific example of the process to which the invention is not limited, the following is given for the purpose of illustration: A mixture of hydrocarbon vapors or hydrocarbon gases and vapors, containing di-enes, such as isoprene or its homologues in amounts varying from 5 to 10%, more or less, and preferably about 7 to 8%, is passed through a heated container holding bauxite or fullers' earth, porous clay, or even animal or vegetable charcoal maintained at a temperature of approximately 200° C., during which operation the di-enes are polymerized probably by a contact action of the fullers' earth or like material, forming a hydrocarbon resin in a molten condition. This hydrocarbon resin, while molten, flows downwardly through the receptacle in which the fullers' earth is contained, and while still molten is drawn off at the bottom of the container through a suitable pipe and may be cast into molds.

The product of this example is a brownish brittle solid, fairly soluble in alcohol (so that it can be made into a varnish) is readily soluble in cold or hot benzene, is fairly soluble in ether and is readily soluble in acetone. If treated with gasolene, a part (perhaps one-half) is soluble and the remainder is insoluble.

In a particular form of carrying out the process, I have found that hydrocarbon gases and vapors resulting from the cracking of mineral oil, such as kerosene or petrolite, under high pressure and containing about 7 or 8% of di-enes, can conveniently be employed, the resinous polymerization product being in appearance somewhat similar to colophony, especially the darker colored varieties. The resinous product softens gradually upon heating to about 75° C., and becomes entirely liquid at temperatures in the vicinity of the boiling point of water (about 100° C.). The exact boiling point cannot be given since this varies with the character of the di-enes used and the conditions of the operation, but the products made by the above process begin to vaporize in the vicinity of 270° C. The saturated hydrocarbons and the olefin hydrocarbons are not altered by passing through the fullers' earth or like material, and may subsequently be condensed and a further quantity of isoprene or other di-ene compounds added thereto for re-use in the process. The presence of the large bulk of hydrocarbon gases and vapors makes the polymerization go on substantially quantitatively, and forms a convenient vehicle in which to carry the di-enes. The temperature of the bauxite or fullers' earth should be held at or above the boiling point of the paraffin hydrocarbons and the olefin hydrocarbons present in order that these will not condense along with the polymerized di-enes. A temperature of from 110° C. to 250° C. is suitable.

The composition of the resin seems to be $(C_{10}H_{16})_n$. The resin is suitable for use as an insulating compound, or as an ingredient of varnish or of various plastic compositions and of liquid coating compositions, can be vulcanized with sulfur and possesses the advantage over colophony that it is not substantially attacked by alkalis.

In place of using the mixture of hydrocarbons above referred to, isoprene or other volatile di-ene compounds may be mixed with ordinary gasolene consisting essentially of saturated open chain hydrocarbons and the mixture vaporized, and the vapors passed through the contact mass. For commercial reasons, however, it is preferred to produce the di-enes in the mixture with the other hydrocarbon vapors by cracking oil, and the proportion of di-enes therein will depend upon the particular conditions of the cracking, especially the local overheating of the gases and vapors.

The polymerization reaction can be effected conveniently at ordinary atmospheric pressure, or at pressures slightly above or slightly below atmospheric.

What I claim is:

1. A process of producing resinous condensation products which comprises passing a vaporized mixture comprising di-enes, in contact with a heated contact mass at a temperature substantially above the melting point of the resinous products.

2. A process of producing resinous condensation products which comprises passing a vaporized mixture comprising isoprene and fatty chain-form hydrocarbons, in contact with a heated contact mass at a temperature substantially above the melting point of the resinous products.

3. A process of making resinous condensation products which comprises passing a mixture of hydrocarbon vapors containing from about 5% to about 10% of di-enes, in contact with a porous mass of heated absorbent contact material, whereby the di-ene compounds therein are, at least in part, polymerized into resinous condensation products, maintaining the contact material at a temperature above the melting point of the said condensation products but below the decomposition temperature thereof, and separately drawing off the remaining hydrocarbon vapors and the liquefied condensation products, and subsequently solidifying the latter by cooling.

4. A process of producing resinous condensation products which comprises maintaining a body of fullers' earth at a temperature of between 110 and 250° C., passing therethrough a current of hydrocarbon vapors containing a substantial amount of di-ene compounds, drawing off, from the bottom of the body of fullers' earth the molten condensation product and cooling the latter.

5. A resinous condensation product consisting of polymerized di-ene compounds, such product having the appearance of colophony, having the formula $(C_{10}H_{16})_n$ melting at a temperature in the vicinity of 100° C., soluble in alcohol and ether, insoluble in water, said product being a brittle solid at atmospheric temperature.

6. A hydrocarbon resin which may be produced by condensing di-enes at a temperature between about 110 and 250° C., in the presence of a heated absorbent solid contact body.

In testimony whereof I affix my signature.

HENRY V. DUNHAM.